United States Patent
Hiramoto et al.

(10) Patent No.: US 10,012,167 B2
(45) Date of Patent: Jul. 3, 2018

(54) ELECTRONIC THROTTLE

(71) Applicant: DENSO CORPORATION, Kariya, Aichi-pref. (JP)

(72) Inventors: Satoru Hiramoto, Nagoya (JP); Toru Shimizu, Nagoya (JP); Yoshiyuki Kono, Obu (JP)

(73) Assignee: DENSO CORPORATION, Kariya (JP)

(*) Notice: Subject to any disclaimer, the term of this patent is extended or adjusted under 35 U.S.C. 154(b) by 251 days.

(21) Appl. No.: 14/506,035

(22) Filed: Oct. 3, 2014

(65) Prior Publication Data

US 2015/0096533 A1   Apr. 9, 2015

(30) Foreign Application Priority Data

Oct. 4, 2013  (JP) .................................. 2013-209495
Sep. 5, 2014  (JP) .................................. 2014-181431

(51) Int. Cl.
*F02D 41/22*   (2006.01)
*F02D 41/00*   (2006.01)
(Continued)

(52) U.S. Cl.
CPC .......... *F02D 41/222* (2013.01); *F02D 11/106* (2013.01); *F02D 41/0002* (2013.01);
(Continued)

(58) Field of Classification Search
CPC .. F02D 41/222; F02D 11/106; F02D 41/1497; F02D 41/0002; F02D 41/021;
(Continued)

(56) References Cited

U.S. PATENT DOCUMENTS 4,445,336 A * 5/1984 Inoue ...................... F02B 33/44
                                              123/559.1
4,566,309 A * 1/1986 van Belzen ........... G01L 27/007
                                              340/459
(Continued)

FOREIGN PATENT DOCUMENTS

EP   1 609 971    12/2005
JP   62-126243    6/1987
(Continued)

OTHER PUBLICATIONS

Office Action (3 pages) dated Dec. 8, 2015, issued in corresponding Japanese Application No. 2014-181431 and English translation (5 pages).

*Primary Examiner* — Sizo Vilakazi
*Assistant Examiner* — Brian Kirby
(74) *Attorney, Agent, or Firm* — Nixon & Vanderhye P.C.

(57) ABSTRACT

An ECU loads detected values of a rotation angle sensor and a pressure sensor which are mounted to an electric throttle, and executes an abnormal-sensor determination control to determine whether one of the rotation angle sensor and the pressure sensor is abnormal. Specifically, the ECU determines that one of the rotation angle sensor and the pressure sensor is abnormal, in a case where a state that a tendency of the actual opening angle detected by the rotation angle sensor does not match a tendency of the pressure detected by the downstream pressure sensor has continued for a period greater than or equal to a predetermined period. Therefore, since the pressure sensor can replace the rotation angle sensor used for detecting abnormality in a conventional technology, two rotation angle sensors can be reduced to one rotation angle sensor, and a cost is reduced.

9 Claims, 13 Drawing Sheets

(51) Int. Cl.
*F02D 41/02* (2006.01)
*F02D 41/14* (2006.01)
*F02D 11/10* (2006.01)

(52) U.S. Cl.
CPC ....... *F02D 41/021* (2013.01); *F02D 41/1497* (2013.01); *F02D 2011/102* (2013.01); *F02D 2041/223* (2013.01); *F02D 2200/0402* (2013.01); *F02D 2200/0404* (2013.01); *F02D 2200/0406* (2013.01); *F02D 2200/0414* (2013.01); *Y02T 10/42* (2013.01)

(58) Field of Classification Search
CPC ..... F02D 2200/0414; F02D 2200/0406; F02D 2011/102; F02D 2200/0402; F02D 2200/0404; F02D 2041/223; F02D 2041/221; F02D 11/105; F02D 11/10; F02D 2011/104; F02D 2011/101; Y02T 10/42
USPC .................................. 123/396, 403
See application file for complete search history.

(56) References Cited

U.S. PATENT DOCUMENTS

| | | | | |
|---|---|---|---|---|
| 4,704,685 A * | 11/1987 | Martinsons | ........... | F02D 41/222 123/479 |
| 4,893,502 A * | 1/1990 | Kubota | ................ | F02D 11/106 324/207.2 |
| 4,976,139 A * | 12/1990 | Miyama | ................. | F02D 41/22 123/493 |
| 4,989,562 A * | 2/1991 | Ohkumo | ................ | F02D 41/22 123/198 D |
| 5,018,383 A * | 5/1991 | Togai | ................... | F02D 41/222 180/197 |
| 5,040,508 A * | 8/1991 | Watanabe | ............... | F02D 11/10 123/396 |
| 5,079,946 A * | 1/1992 | Motamedi | .............. | F02B 77/08 73/114.36 |
| 5,265,572 A * | 11/1993 | Kadomukai | ........... | F02D 11/10 123/396 |
| 5,332,965 A * | 7/1994 | Wolf | ....................... | G01D 3/02 324/202 |
| 5,544,000 A | 8/1996 | Suzuki et al. | | |
| 5,698,778 A * | 12/1997 | Ban | ...................... | F02D 11/106 324/207.2 |
| 5,823,164 A * | 10/1998 | Seki | ...................... | B60K 26/04 123/361 |
| 5,832,895 A * | 11/1998 | Takahashi | ............. | F02D 11/105 123/350 |
| 6,067,958 A * | 5/2000 | Kamimura | ............ | F02D 9/1065 123/337 |
| 6,293,249 B1 * | 9/2001 | Kuretake | ................ | F02D 11/10 123/396 |
| 6,347,613 B1 * | 2/2002 | Rauch | ................... | F02D 11/105 123/337 |
| 6,502,544 B2 * | 1/2003 | Kubota | ................. | F02D 11/106 123/396 |
| 6,681,742 B1 * | 1/2004 | Hirayama | ............. | F02D 11/107 123/399 |
| 6,701,282 B2 * | 3/2004 | Ting | .................... | F02D 41/1401 702/138 |
| 6,725,833 B1 * | 4/2004 | Irihune | .................... | F02D 9/10 123/361 |
| 6,877,471 B1 * | 4/2005 | Tanabe | .................. | F02D 41/222 123/395 |
| 6,892,699 B2 * | 5/2005 | Urushiwara | ............ | F02D 9/105 123/337 |
| 6,997,162 B2 * | 2/2006 | Hirayama | ............. | F02D 11/107 123/399 |
| 7,017,550 B2 * | 3/2006 | Hata | ...................... | F02D 11/105 123/399 |
| 7,021,292 B2 * | 4/2006 | Yamaguchi | ......... | F02D 41/0002 123/479 |
| 7,210,451 B2 * | 5/2007 | Ikeda | .................... | F02D 11/106 123/337 |
| 7,265,539 B2 * | 9/2007 | Rutkowski | ............. | G01D 5/145 324/207.2 |
| 7,383,815 B2 * | 6/2008 | Hirayama | ............. | F02D 11/107 123/399 |
| 7,703,436 B2 * | 4/2010 | Muto | .................... | F02D 11/105 123/361 |
| 7,788,019 B2 * | 8/2010 | Yamashita | .......... | F02D 41/0002 123/479 |
| 2001/0004888 A1 * | 6/2001 | Oki | ....................... | F02D 31/005 123/339.23 |
| 2003/0182050 A1 * | 9/2003 | Maegawa | ............... | F01N 3/101 701/114 |
| 2003/0230287 A1 * | 12/2003 | Ozeki | .................... | F02D 41/222 123/479 |
| 2005/0193977 A1 * | 9/2005 | Hata | .................... | F02D 11/105 123/350 |

FOREIGN PATENT DOCUMENTS

| | | | |
|---|---|---|---|
| JP | 62126243 A | * | 6/1987 |
| JP | 62-168953 | | 7/1987 |
| JP | 2-245444 | | 10/1990 |
| JP | 3-47447 | | 2/1991 |
| JP | 3-229166 | | 10/1991 |
| JP | 8-246916 | | 9/1996 |
| JP | 10-299512 | | 11/1998 |
| JP | 2001-217122 | | 8/2001 |
| JP | 2003-254148 | | 9/2003 |
| JP | 2004-285899 | | 10/2004 |
| JP | 2005-016516 | | 1/2005 |
| JP | 2005-351232 | | 12/2005 |
| JP | 2006-132498 | | 5/2006 |
| JP | 2012-172616 | | 9/2012 |

* cited by examiner

FIG. 7

DETERMINATION TABLE

| DETERMINATION | ROTATION ANGLE SENSOR | PRESSURE SENSOR |
|---|---|---|
| OK | ↑ | ↑ |
| NG | ↑ | → |
| NG | ↑ | ↓ |
| OK | → | → |
| NG | → | ↑ |
| NG | → | ↓ |
| OK | ↓ | ↓ |
| NG | ↓ | → |
| NG | ↓ | ↑ |

ELECTRONIC THROTTLE

CROSS REFERENCE TO RELATED APPLICATION

This application is based on Japanese Patent Application No. 2013-209495 filed on Oct. 4, 2013 and Japanese Patent Application No. 2014-181431 filed on Sep. 5, 2014, the disclosure of which is incorporated herein by reference.

TECHNICAL FIELD

The present disclosure relates to an electronic throttle which feedback controls a driving power supplied to a motor such that an actual opening degree of a throttle valve detected by a rotational angle sensor matches a target throttle opening degree.

BACKGROUND

Conventionally, in an electric throttle in which a throttle valve is driven by a motor, a method for an abnormality determination of a rotation angle sensor detecting an actual opening angle of the throttle valve is well known. According to JP-H06-42907 (U.S. Pat. No. 5,544,000 A), a difference $\Delta V$ between detected values of two rotation angle sensors is compared with a standard value $\Delta V0$. When a state that the difference $\Delta V$ is greater than the standard value $\Delta V0$ has continued for a period greater than or equal to a predetermined period, the rotation angle sensor is determined to be abnormal.

However, the rotation angle sensor for detecting abnormality is necessary to be different from the rotation angle sensor detecting the actual opening angle of the throttle valve. Since two rotation angle sensors are necessary, a cost of the electric throttle becomes greater.

SUMMARY

The present disclosure is made in view of the above matters, and it is an object of the present disclosure to provide an electric throttle in which a pressure sensor detecting an intake pressure of an internal combustion engine is used to replace a rotation angle sensor used for detecting abnormality, and a cost of the electric throttle is reduced.

According to an aspect of the present disclosure, an electric throttle includes a throttle body, a throttle valve, a rotation angle sensor, a motor, a downstream pressure sensor, and an abnormal-sensor determining portion. The throttle body is disposed in an intake passage of an internal combustion engine and forms a throttle passage corresponding to a part of the intake passage. The throttle valve adjusts an intake quantity of the internal combustion engine by increasing or decreasing an opening area of the throttle passage. The rotation angle sensor detects an actual opening angle of the throttle valve. The motor generates a torque to drive the throttle valve such that the actual opening angle of the throttle valve detected by the rotation angle sensor matches a target throttle opening angle. The downstream pressure sensor detects a pressure downstream of the throttle valve. The abnormal-sensor determining portion determines that one of the rotation angle sensor and the downstream pressure sensor is abnormal, in a case where a state that a tendency of the actual opening angle detected by the rotation angle sensor does not match a tendency of the pressure detected by the downstream pressure sensor has continued for a period greater than or equal to a predetermined period.

Therefore, since the pressure sensor can replace the rotation angle sensor used for detecting abnormality in a conventional technology, two rotation angle sensors can be reduced to one rotation angle sensor, and a cost of the electric throttle is reduced.

BRIEF DESCRIPTION OF THE DRAWINGS

The above and other objects, features and advantages of the present disclosure will become more apparent from the following detailed description made with reference to the accompanying drawings. In the drawings:

FIG. 7 is a diagram showing a determination table indicating tendencies of detected values of the rotation angle sensor and the downstream pressure sensor, according to the first embodiment;

DETAILED DESCRIPTION

Figure 1:
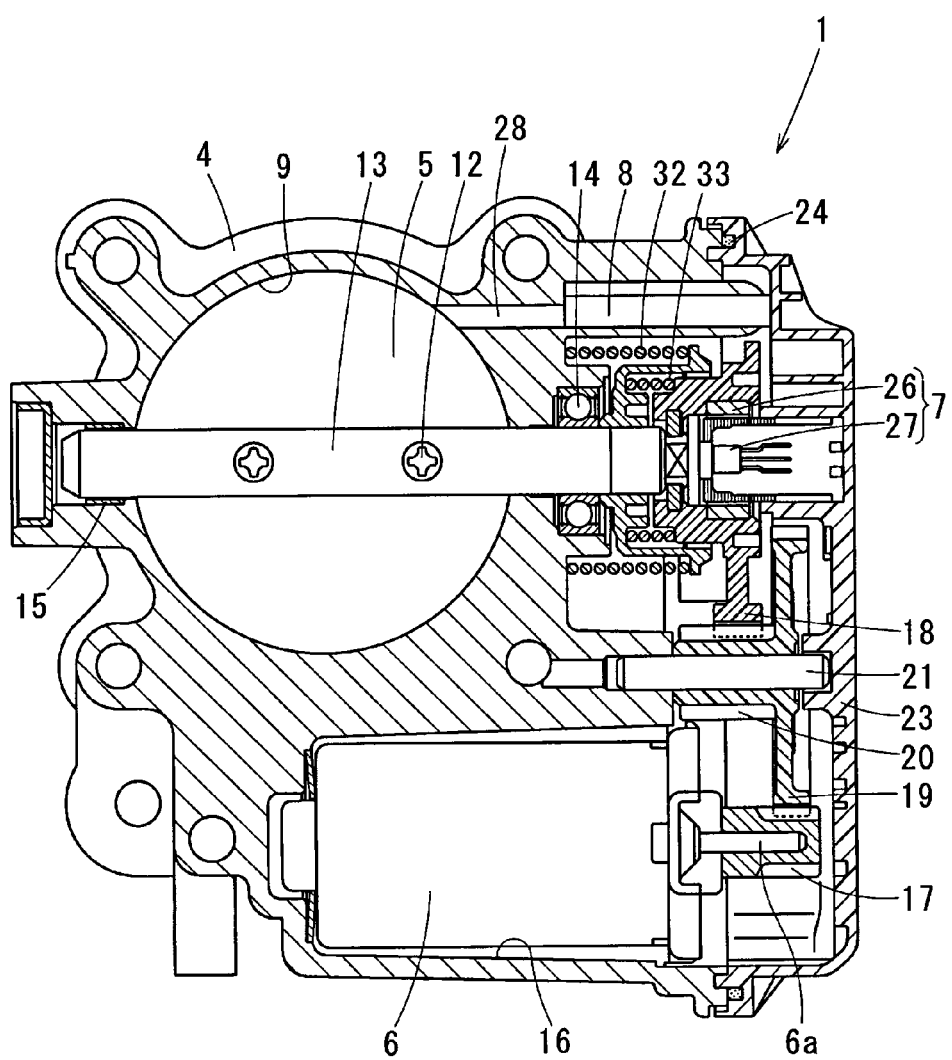
FIG. 1 is a sectional diagram showing an electric throttle according to a first embodiment of the present disclosure.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

Hereafter, embodiments of the present disclosure will be detailed.

First Embodiment

Figure 2:
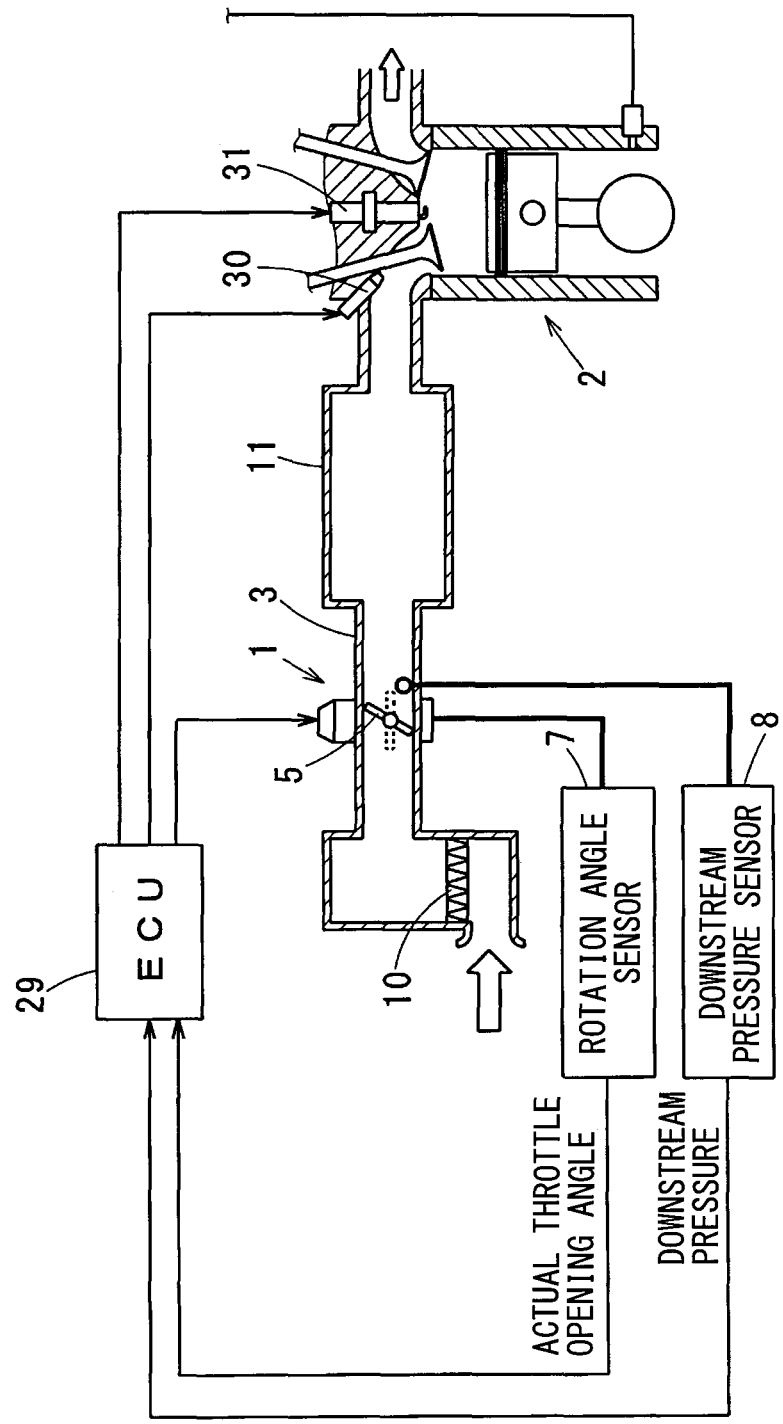
FIG. 2 is a schematic diagram showing an intake system of an engine according to the first embodiment.

As shown in FIGS. 1 and 2, an electric throttle 1 includes a throttle body 4, a throttle valve 5, a motor 6, a rotation angle sensor 7, and a downstream pressure sensor 8. The throttle body 4 is disposed in an intake passage 3 of an engine 2. The throttle valve 5 adjusts an intake quantity of the engine 2. The motor 6 generates a torque to drive the throttle valve 5. The rotation angle sensor 7 detects an actual opening angle of the throttle valve 5 that is referred to as an actual throttle opening angle. The downstream pressure sensor 8 detects an intake pressure of the engine 2.

The throttle body 4 forms a throttle passage 9 communicating with the intake passage 3. In other words, the throttle passage 9 corresponds to a part of the intake passage 3. The throttle passage 9 includes an upstream end connected to an outlet of an air cleaner 10 via an air hose, and a downstream end connected to an inlet of a surge tank 11.

The throttle valve 5 is fixed to a shaft 13 via a fastener 12 and is disposed at a position inside of the throttle passage 9. The fastener 12 may be a screw. The throttle valve 5 is rotatable integrally with the shaft 13 between a fully-closed position and a fully-open position. The fully-closed position indicated by a dashed-dotted line A is a position where the throttle passage 9 is fully closed by the throttle valve 5, and the fully-open position indicated by a dashed-dotted line B is a position where the throttle passage 9 is fully opened by the throttle valve 5.

The shaft 13 is provided to penetrate the throttle passage 9 in a radial direction of the throttle passage 9, and is rotatably supported by the throttle body 4 via a rolling bearing 14 and a sliding bearing 15.

The motor 6 is a direct current motor which outputs an output torque linearly relative to an input current, and is housed in a motor chamber 16 formed in the throttle body 4.

The output torque of the motor 6 is amplified by a gear train and is transmitted to the shaft 13.

Figure 3:
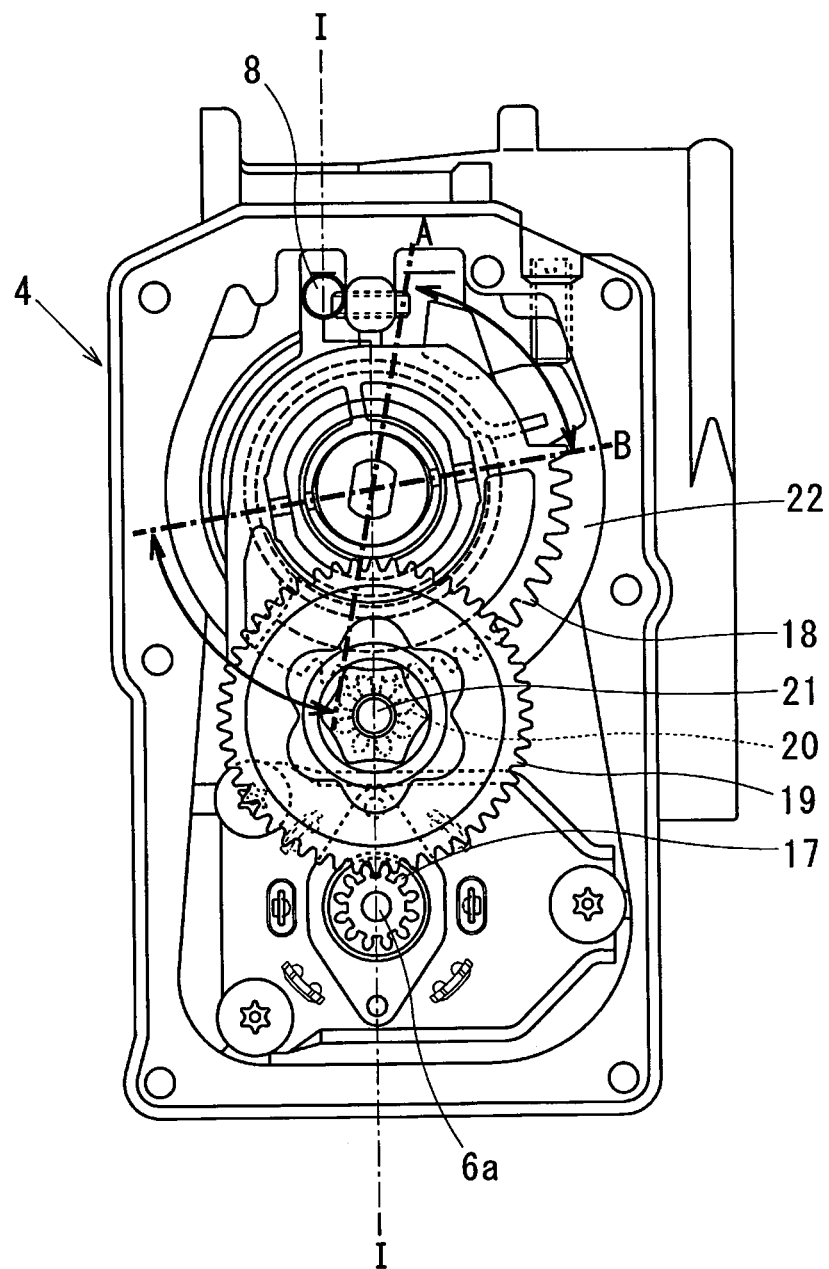
FIG. 3 is a plan view showing the electric throttle without a cover, according to the first embodiment.

As shown in FIG. 3, the gear train includes a motor gear 17, a valve gear 18, and a transmission gear. The motor gear 17 is mounted to an output shaft 6a of the motor 6. The valve gear 18 is mounted to an end portion of the shaft 13. The transmission gear transmits a rotation of the motor gear 17 to the valve gear 18. FIG. 3 is a plan view showing the electric throttle 1 without a cover 23. Further, FIG. 1 is a sectional diagram of FIG. 3 along line I-I.

The transmission gear includes a large-diameter gear 19 engaged with the motor gear 17, and a small-diameter gear 20 engaged with the valve gear 18. The large-diameter gear 19 and the small-diameter gear 20 are provided on the same axle integrally with each other, and are rotatably supported by a transmission shaft 21.

The gear train is disposed in a gear chamber 22 formed in an end portion of the throttle body 4, and is covered by the cover 23. The cover 23 is made of resin.

Figure 4:
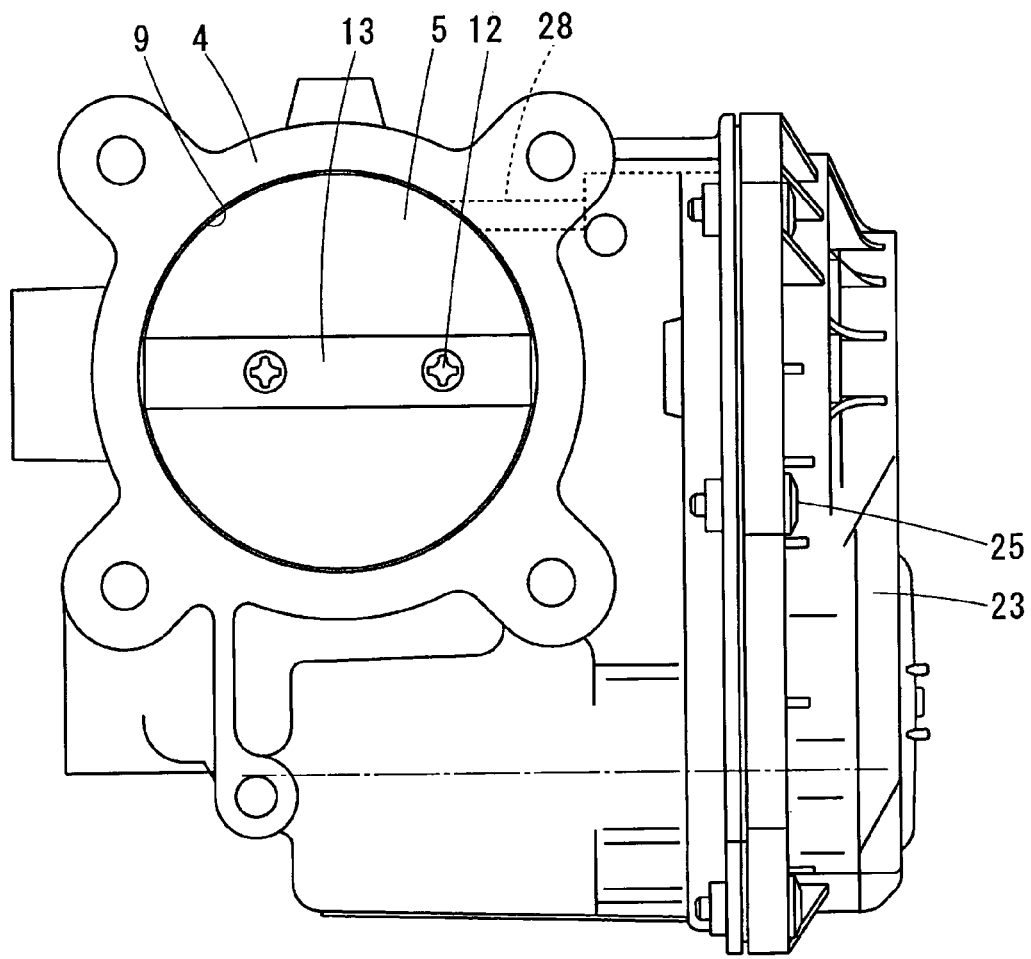
FIG. 4 is a side view of the electric throttle according to the first embodiment.

The cover 23 is assembled to an end surface of the end portion of the throttle body 4 via a seal part 24 as shown in FIG. 1, and is fixed to the throttle body 4 via a screw 25 as shown in FIG. 4.

Figure 5:
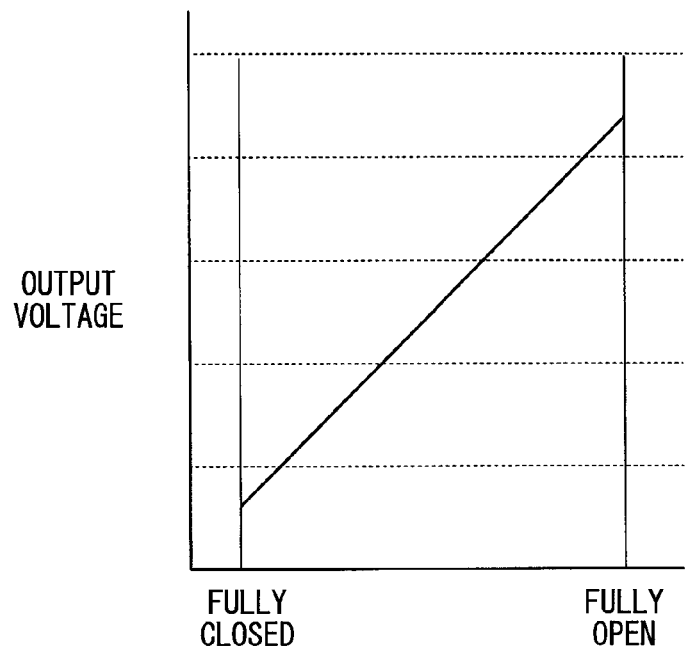
FIG. 5 is a graph showing a property of a rotation angle sensor according to the first embodiment.

The rotation angle sensor 7 includes a permanent magnet 26 mounted to an inner periphery of the valve gear 18, and a hall-effect IC 27 disposed in an interior of the permanent magnet 26 without in contact with the permanent magnet 26. As shown in FIG. 5, an output voltage of the hall-effect IC 27 varies linearly relative to the actual throttle opening angle. The hall-effect IC 27 includes a hall element, an amplifying circuit, and a temperature compensation circuit. The hall element outputs an analog voltage according to a magnetic-flux density. The amplifying circuit amplifies an output of the hall element. The temperature compensation circuit compensates a temperature property of the hall element. The hall-effect IC 27 is held by the cover 23.

Figure 6:
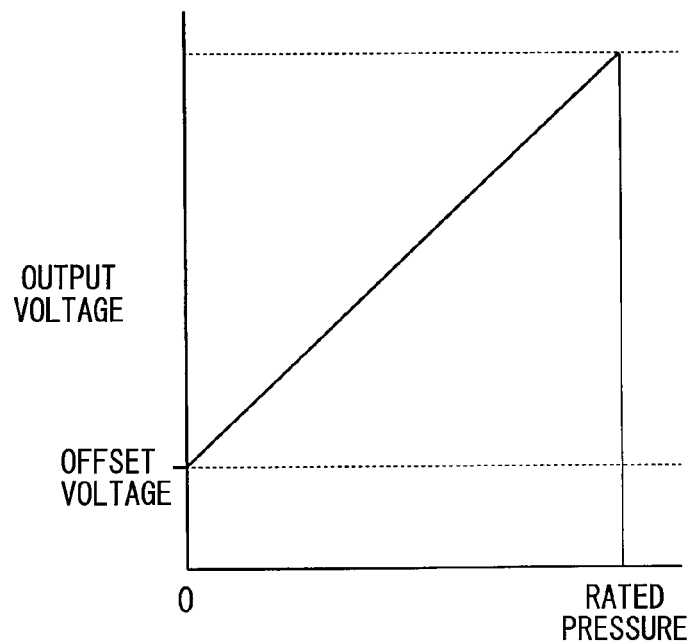
FIG. 6 is a graph showing a property of a downstream pressure sensor according to the first embodiment.

The downstream pressure sensor 8 is a semi-conductor pressure sensor which detects the intake pressure using a piezoresistive effect. The piezoresistive resistance effect indicates that an electric resistance of the downstream pressure sensor 8 changes when a pressure is applied to the downstream pressure sensor 8. As shown in FIG. 6, the output voltage varies linearly relative to the pressure. As shown in FIG. 1, the downstream pressure sensor 8 is inserted into an interior of a downstream-pressure introducing passage 28 formed in the throttle body 4. The downstream pressure sensor 8 detects a pressure (intake pressure) in the throttle passage 9 downstream of the throttle valve 5 via the downstream-pressure introducing passage 28.

In other words, the downstream pressure sensor 8 detects a pressure in the throttle passage 9 downstream of the fully-closed position.

The downstream-pressure introducing passage 28 penetrates the throttle body 4 between the gear chamber 22 and the throttle passage 9 in a direction parallel to an axial center of the shaft 13. The downstream-pressure introducing passage 28 includes a first end which is open at the gear chamber 22 at a position out of a movable range of the gear train, and a second end which is open at the throttle passage 9 at a position downstream of the fully-closed position.

The actual throttle opening angle detected by the rotation angle sensor 7 and the intake pressure detected by the downstream pressure sensor 8 are converted to analog voltages, respectively, and are outputted to an ECU 29.

The ECU 29 computes a flow quantity of an air flowing through the throttle valve 5 based on a detected value of the rotation angle sensor 7, a detected value of the downstream pressure sensor 8, and a temperature of the air suctioned into the engine 2. In this case, the flow quantity of the air flowing through the throttle valve 5 corresponds to an air flow quantity. The detected value of the rotation angle sensor 7 corresponds to the actual throttle opening angle detected by the rotation angle sensor 7, and the detected value of the downstream pressure sensor 8 corresponds to the intake pressure detected by the downstream pressure sensor 8. The ECU 29 feedback controls a driving current of the motor 6 using the air flow quantity such that the actual throttle opening angle matches a target throttle opening angle, and executes a fuel injection timing control of an injector 30, an injection quantity control of the injector 30, and an ignition timing control of an ignition plug 31.

The air flow quantity corresponds to a flow quantity of the air flowing through the throttle passage 9 according to an opening angle of the throttle valve 5, and corresponds to the intake quantity of the engine 2. The temperature of the air suctioned into the engine 2 can be detected by using a diode provided in the temperature compensation circuit of the hall-effect IC 27.

The ECU 29 executes an abnormal-sensor determination control to determine whether one of the rotation angle sensor 7 and the downstream pressure sensor 8 is abnormal in an engine operation. The ECU 29 corresponds to an abnormal-sensor determining portion.

When the rotation angle sensor 7 is normal, the output voltage of the rotation angle sensor 7 increases in accordance with an increase in actual throttle opening angle. In this case, when the downstream pressure sensor 8 is normal, since the intake quantity increases in accordance with the increase in actual throttle opening angle, the output voltage of the downstream pressure sensor 8 also increases. Further, when the actual throttle opening angle decreases, the output voltage of the rotation angle sensor 7 and the output voltage of the downstream pressure sensor 8 decreases. Thus, when both the rotation angle sensor 7 and the downstream pressure sensor 8 are normal, a tendency of the detected value of the rotation angle sensor 7 matches a tendency of the detected value of the downstream pressure sensor 8. In other words, when the tendency of the detected value of the rotation angle sensor 7 does not match the tendency of the detected value of the downstream pressure sensor 8, it can be determined that one of the rotation angle sensor 7 and the downstream pressure sensor 8 is abnormal.

In the abnormal-sensor determination control, when a state that the tendency of the detected value of the rotation angle sensor 7 does not match the tendency of the detected value of the downstream pressure sensor 8 has continued for a period greater than or equal to a predetermined period, the ECU 29 determines that one of the rotation angle sensor 7 and the downstream pressure sensor 8 is abnormal. In this case, the predetermined period may be a time period from 200 ms to 250 ms.

FIG. 7 is a diagram showing a determination table indicating tendencies of detected values of the rotation angle sensor 7 and the downstream pressure sensor 8. In the determination table, when the tendency of the detected value of the rotation angle sensor 7 matches the tendency of the detected value of the downstream pressure sensor 8, a determination is "OK". When the tendency of the detected value of the rotation angle sensor 7 does not match the tendency of the detected value of the downstream pressure sensor 8, the determination is "NG". In addition, tendencies of detected values of the rotation angle sensor 7 and the downstream pressure sensor 8 are indicated by arrows with different directions.

When the determination is "NG", following conditions are considered.

In a first condition, even though the output voltage of the rotation angle sensor 7 increases, the output voltage of the downstream pressure sensor 8 is constant or decreases.

In a second condition, even though the output voltage of the rotation angle sensor 7 is constant, the output voltage of the downstream pressure sensor 8 increases or decreases.

In a third condition, even though the output voltage of the rotation angle sensor 7 decreases, the output voltage of the downstream pressure sensor 8 is constant or increases.

According to the present embodiment, in the electric throttle 1, since the downstream pressure sensor 8 can replace the rotation angle sensor 7 used for detecting abnormality in a conventional technology, two rotation angle sensors can be reduced to one rotation angle sensor, and a cost is reduced. Further, since the downstream pressure sensor 8 is assembled to the throttle body 4, a time lag between a timing that the detected value of the rotation angle sensor 7 varies and a timing that the detected value of the downstream pressure sensor 8 varies becomes exceedingly small. Therefore, an abnormal-sensor detection according to the present embodiment where the downstream pressure sensor 8 replaces the rotation angle sensor 7 used for detecting abnormality can obtain the same effects as the abnormal-sensor detection according to the conventional technology.

According to the present embodiment, when the ECU 29 determines that the tendency of the detected value of the rotation angle sensor 7 does not match the tendency of the detected value of the downstream pressure sensor 8 in the abnormal-sensor determination control, it can be determined that one of the rotation angle sensor 7 and the downstream pressure sensor 8 has malfunctioned. In this case, the ECU 29 can notice a driver that one of the rotation angle sensor 7 and the downstream pressure sensor 8 has malfunctioned, and can store an abnormal information such as an abnormal code.

According to the present embodiment, the electric throttle 1 further includes a return spring 32 applying an elastic force to the shaft 13 in a valve-closing direction of the throttle valve 5, and a default spring 33 applying an elastic force to the shaft 13 toward a predetermined position from the fully-open position. In this case, the predetermined position is a position where the opening angle of the throttle valve 5 is a predetermined angle corresponding to a default angle. When the motor 6 is deenergized, the return spring 32 and the default spring 33 can hold the throttle valve 5 at the default angle. Thus, when the ECU 29 determines that the tendency of the detected value of the rotation angle sensor 7 does not match the tendency of the detected value of the downstream pressure sensor 8 in the abnormal-sensor determination control, the ECU 29 terminates an energization of the motor 6, and the throttle valve 5 is held at the default angle by the return spring 32 and the default spring 33. Therefore, an evacuation travel can be ensured.

Hereafter, other embodiments according to the present disclosure will be described.

The substantially same parts and the components as the first embodiment are indicated with the same reference numeral and the same description will not be reiterated.

Second Embodiment

Figure 9:
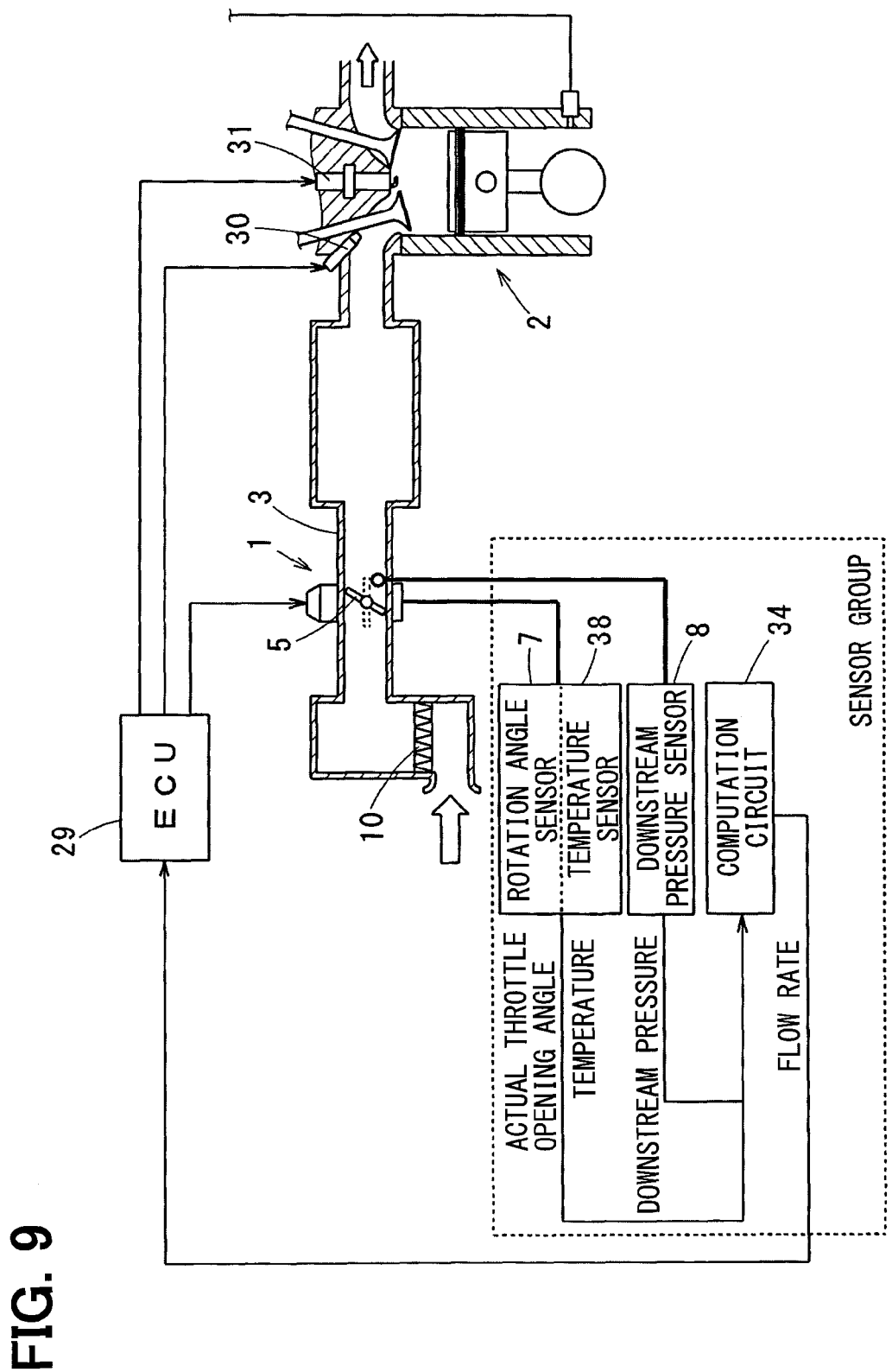
FIG. 9 is a schematic diagram showing the intake system of the engine according to the second embodiment.

As shown in FIG. 9, the electric throttle 1 according to a second embodiment of the present disclosure further includes a computation circuit 34 computing an air quantity flowing through the throttle valve 5.

Figure 8:
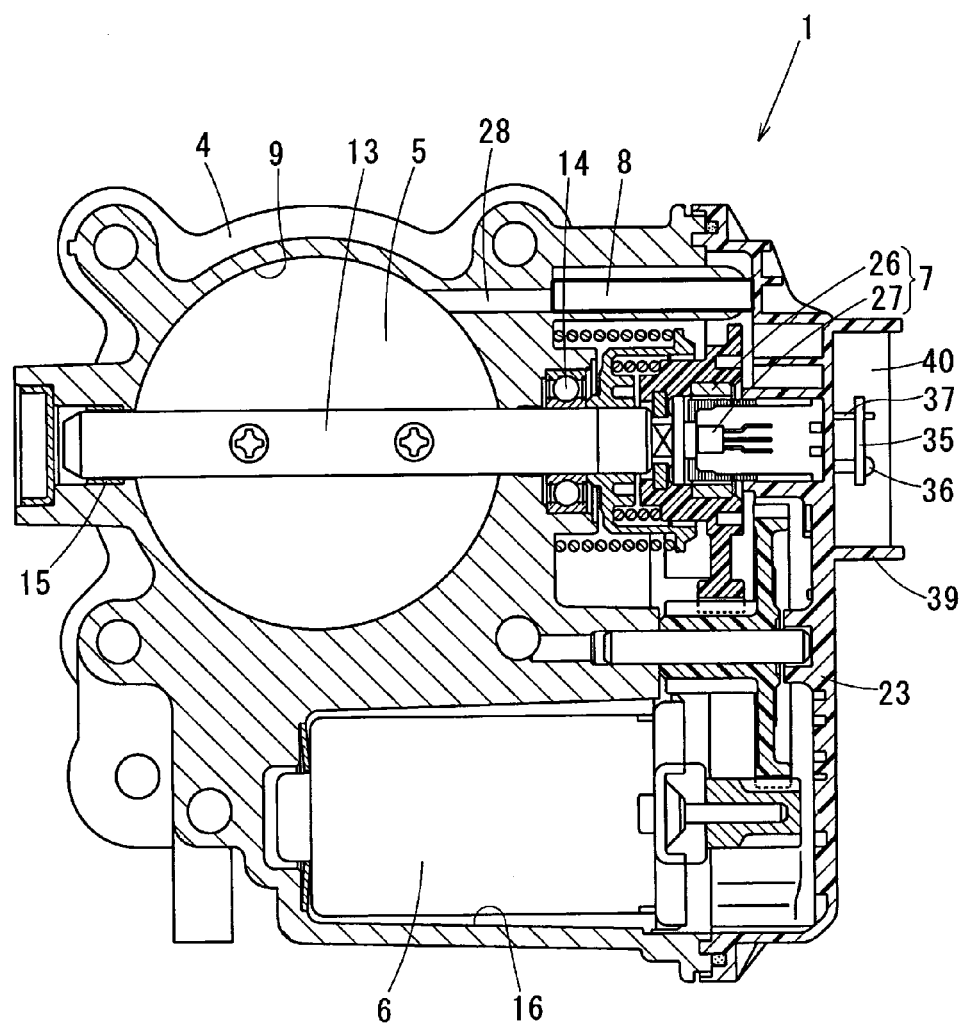
FIG. 8 is a sectional diagram showing the electric throttle according to a second embodiment of the present disclosure.

The computation circuit 34 includes a semi-conductor chip and a circuit substrate 35. The semi-conductor chip is assembled to the circuit substrate 35. As shown in FIG. 8, the circuit substrate 35 is fixed to an outer surface of the cover 23 by a fastener 36, and is connected to a first end of an inner wire (not shown) laid in the cover 23 via a connection pin 37. The fastener 36 may be a vis. The inner wire has a second wire connected to terminals of the rotation angle sensor 7, the downstream pressure sensor 8, and a temperature sensor 38. The temperature sensor 38 detects the temperature of an intake air. In addition, the temperature sensor 38 can be replaced by a diode provided in the temperature compensation circuit of the hall-effect IC 27.

Figure 10:
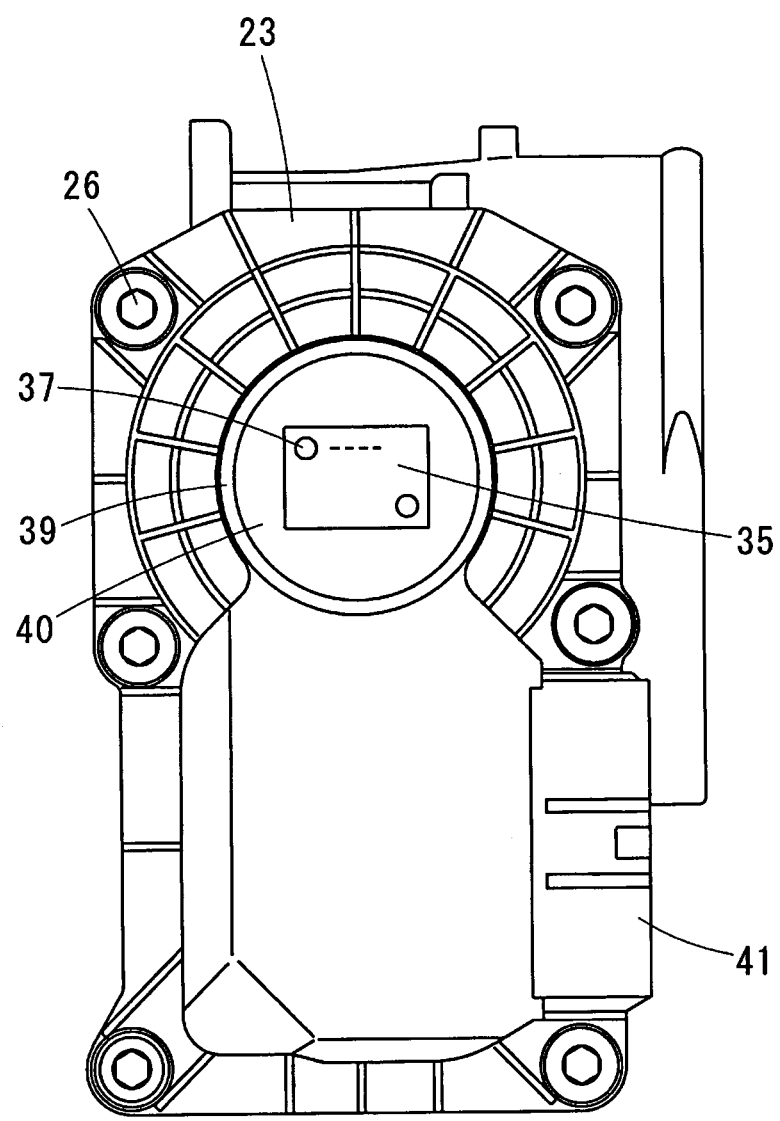
FIG. 10 is a plan view showing the cover provided with a computation circuit, according to the second embodiment.

As shown in FIG. 10, the outer surface of the cover 23 is provided with an outer wall 39 surrounding the circuit substrate 35. The outer wall 39 has a cylindrical shape. An interior of the outer wall 39 is filled with a sealing member 40 to protect the circuit substrate 35. The sealing member 40 may be epoxy resin.

The circuit substrate 35 is connected to a pin terminal (not shown), and the pin terminal is electrically connected to a terminal (not shown) of a connector 41. The connector 41 is provided integrally with the cover 23. The terminal of the connector 41 is connected to the ECU 29 via a wiring cord. The intake quantity computed by the computation circuit 34 is converted to an electric signal and is outputted to the ECU 29.

Hereafter, a computation of the intake quantity according to the computation circuit 34 will be described.

A relationship between the intake quantity and a flow rate of the intake air is indicated by an equation (1).

$$Q = C \times A \times V \tag{1}$$

Q indicates the intake quantity, C indicates a flowing coefficient, A indicates an opening area of the throttle passage 9, and V indicates the flow rate of the intake air flowing through the throttle valve 5. The flowing coefficient C is established by a previous test in which a relationship between the actual throttle opening angle and the flow rate is measured.

The opening area A can be geometrically calculated based on the actual throttle opening angle.

The flow rate V is indicated by an equation (2) according to Bernoulli's principle.

$$V = (2 \times \Delta P / \rho)^{1/2} \quad (2)$$

$\Delta P$ indicates a differential pressure between a pressure in the throttle passage 9 upstream of the throttle valve 5 and the pressure in the throttle passage 9 downstream of the throttle valve 5, and $\rho$ indicates an air density.

The pressure in the throttle passage 9 upstream of the throttle valve 5 corresponds to an atmospheric pressure, and the pressure in the throttle passage 9 downstream of the throttle valve 5 corresponds to a detected value of the downstream pressure sensor 8.

A relationship between the air density $\rho$, the atmospheric pressure P, and an air temperature t is indicated by an equation (3). The unit of the air density $\rho$ is kg/m$^3$, the unit of the atmospheric pressure P is atm, and the unit of the air temperature t is degree Celsius.

$$\rho = 1.293 \times P / (1 + 0.00367 \times t) \quad (3)$$

Since the air density $\rho$ varies according to the air temperature t, the flow rate V can be computed corresponding to a temperature change by correcting the air density $\rho$ according to a temperature detected by the temperature sensor 38.

According to the present embodiment, since the electric throttle 1 is provided with the computation circuit 34 computing the intake quantity of the engine 2, the rotation angle sensor 7, the downstream pressure sensor 8, the temperature sensor 38, and the ECU 29 are unnecessary to be connected to each other by wires, respectively. In other words, a connector terminal of the electric throttle 1 is connected to the ECU 29 by only one wire. Thus, a wiring number used to connect the rotation angle sensor 7, the downstream pressure sensor 8, and the temperature sensor 38 to the ECU 29 can be reduced. Therefore, a cost can be reduced, and a work load of connecting the wires can be reduced.

Further, since sensors are integrated in the electric throttle 1, a mounting limit of the electric throttle 1 is not deteriorated. Therefore, a position of the electric throttle 1 to which a pipe of a positive crankcase ventilation (PCV) device is connected can be ensured.

Third Embodiment

Figure 11:
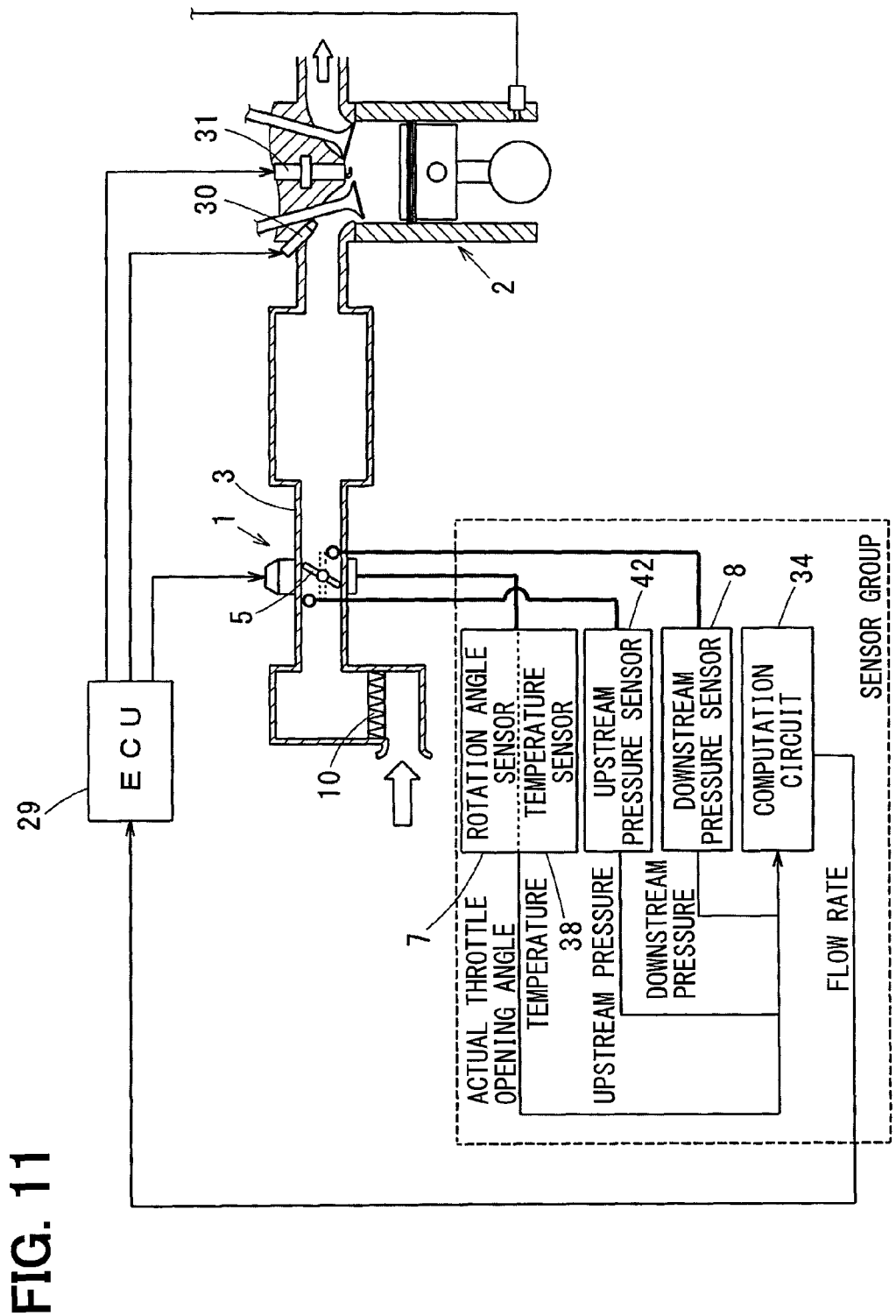
FIG. 11 is a schematic diagram showing the intake system of the engine according to a third embodiment of the present disclosure.

As shown in FIG. 11, the electric throttle 1 according to a third embodiment of the present disclosure further includes an upstream pressure sensor 42 detecting the pressure in the throttle passage 9 upstream of the throttle valve 5, in addition to a configuration of the electric throttle 1 according to the second embodiment.

Figure 12:
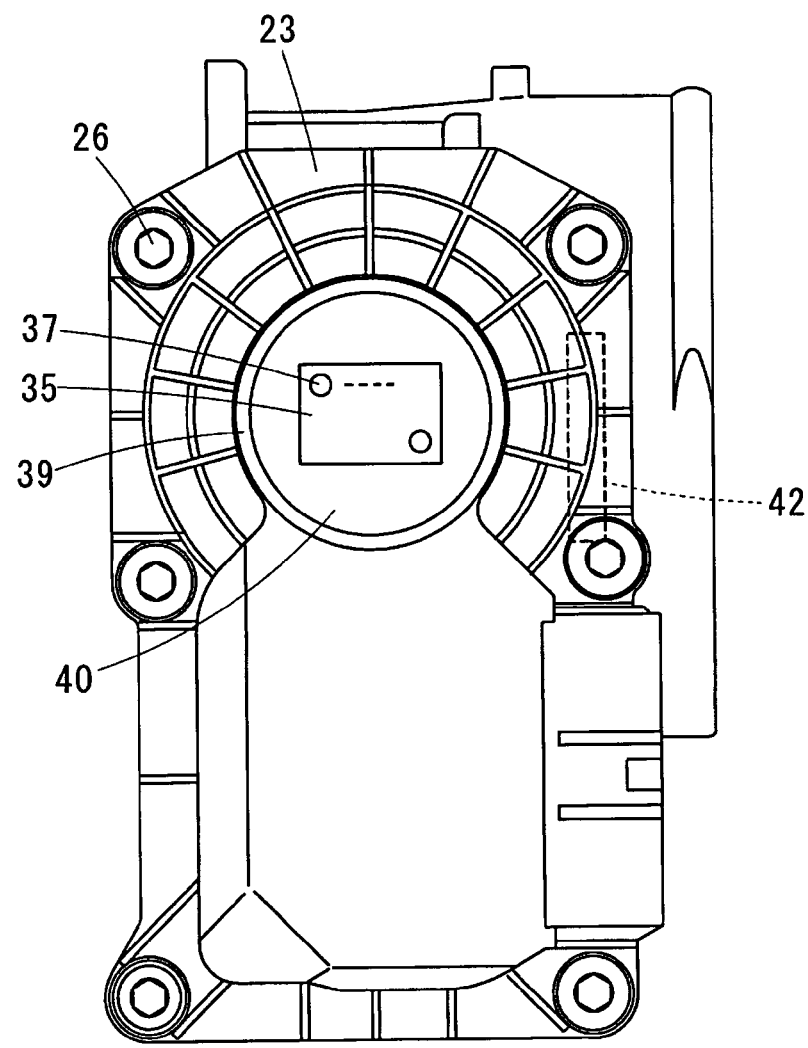
FIG. 12 is a plan view showing the cover provided with a computation circuit, according to the third embodiment.

As shown in FIG. 12, the upstream pressure sensor 42 is disposed at a position out of the movable range of the gear train and a position inside of the cover 23. The upstream pressure sensor 42 detects the pressure in the throttle passage 9 upstream of the throttle valve 5 via an upstream-pressure introducing passage 43 formed in the throttle body 4. In other words, the upstream pressure sensor 42 detects the pressure in the throttle passage 9 upstream of the fully-closed position.

Figure 13:
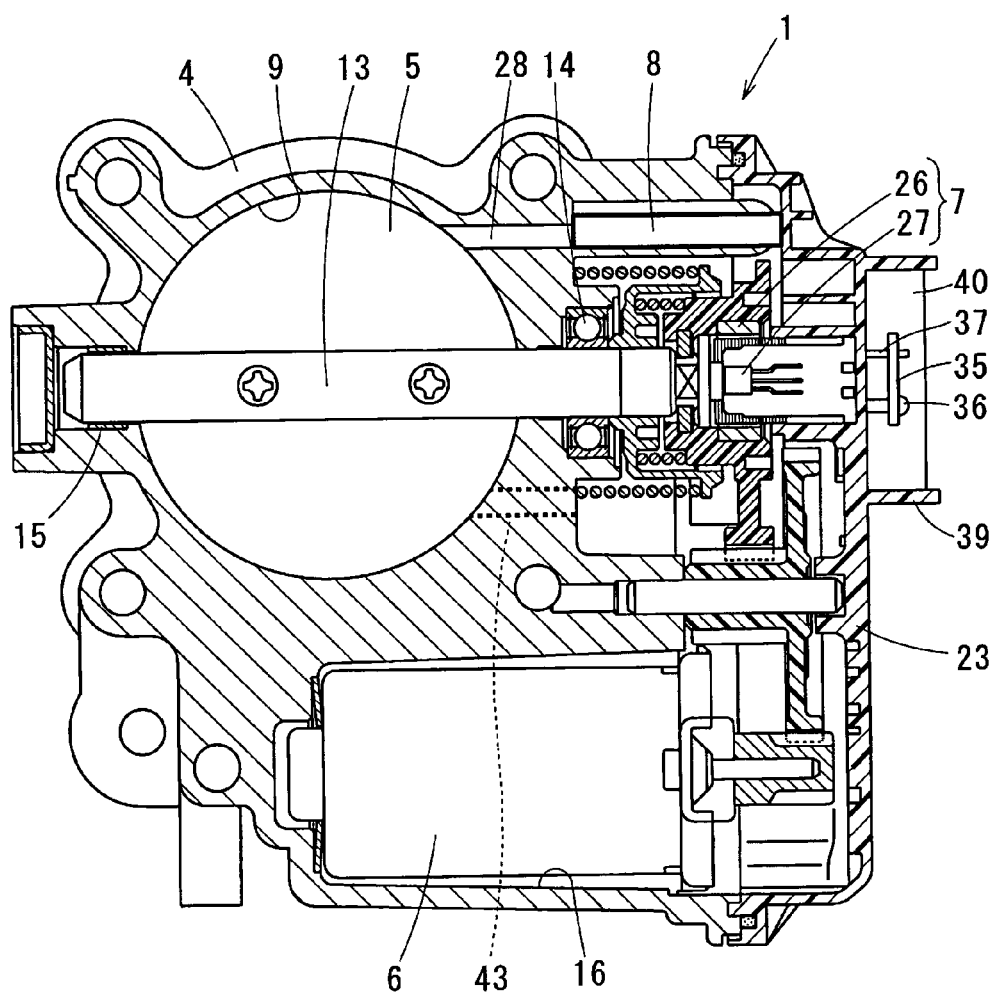
FIG. 13 is a sectional diagram showing the electric throttle according to the third embodiment.
Figure 14:
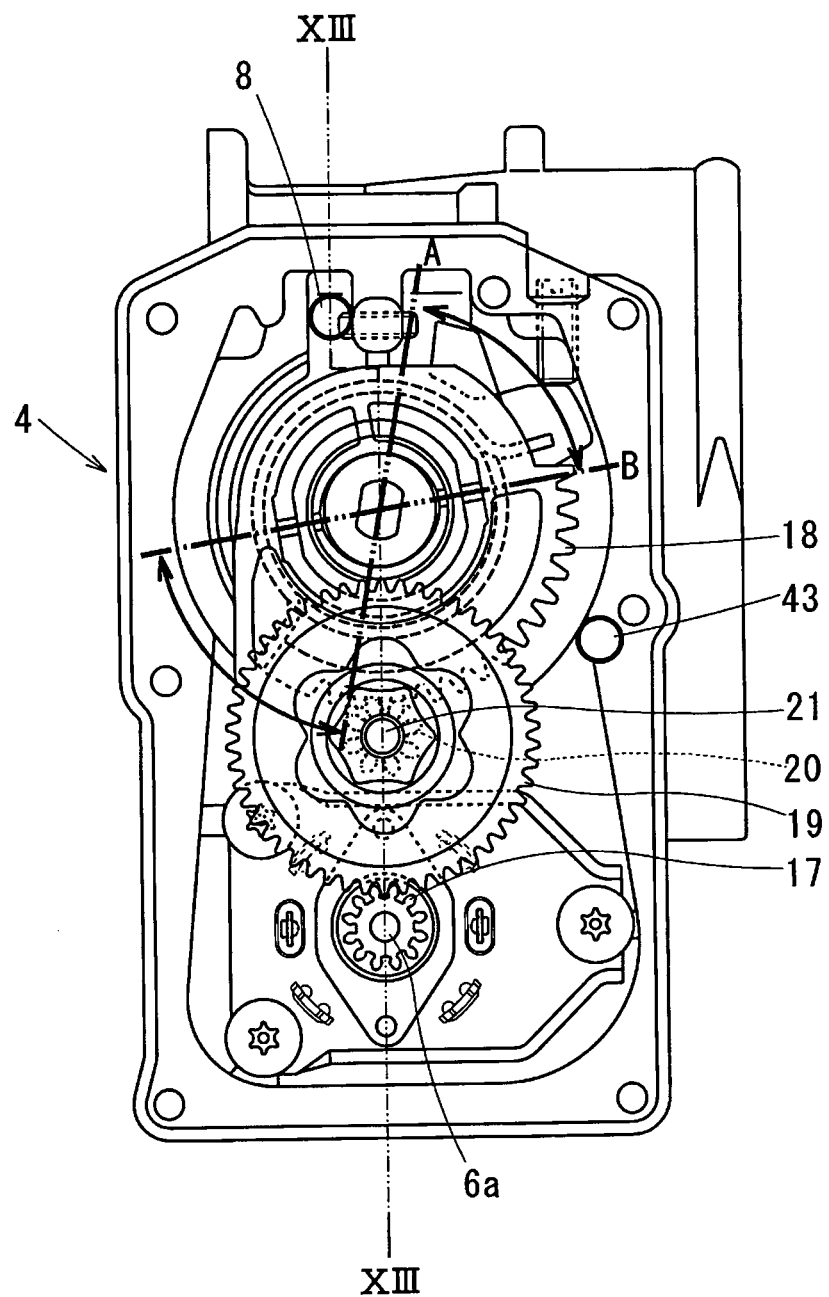
FIG. 14 is a plan view showing the electric throttle without the cover, according to the third embodiment.

As shown in FIGS. 13 and 14, the upstream-pressure introducing passage 43 penetrates the throttle body 4 between the gear chamber 22 and the throttle passage 9 in the direction parallel to the axial center of the shaft 13. The upstream-pressure introducing passage 43 includes a first end which is open at the gear chamber 22 at a position out of the movable range of the gear train, and a second end which is open at the throttle passage 9 at a position upstream of the fully-closed position. Further, FIG. 13 is a sectional diagram of FIG. 14 along line XIII-XIII.

According to the present embodiment, since the pressure in the throttle passage 9 upstream of the throttle valve 5 is detected by the upstream pressure sensor 42 without being a fixed value such as the atmospheric pressure, the differential pressure can be accurately computed. Therefore, since an accuracy of computing the intake quantity by using the computation circuit 34 is improved, a fuel injection control can be accurately executed, and a consumption of the fuel can be improved.

Other Embodiment

According to the first embodiment, the electric throttle 1 is provided with the downstream pressure sensor 8. However, the downstream pressure sensor 8 may be disposed at a position in the intake passage 3 downstream of the electric throttle 1 such as the surge tank 11 or an intake manifold. In this case, it is unnecessary to provide the downstream pressure sensor 8, and an existing intake pressure sensor can be used.

According to the second embodiment, the diode provided included in the temperature compensation circuit of the hall-effect IC 27 is also used as the temperature sensor 38. However, the temperature sensor 38 may be provided as a member different from the diode.

According to the second embodiment and the third embodiment, the circuit substrate 35 including the computation circuit 34 is provided on the outer surface of the cover 23. However, the circuit substrate 35 may be provided in an interior of the cover 23. In this case, it is unnecessary to provide the outer wall 39, further, the sealing member 40 is also unnecessary.

While the present disclosure has been described with reference to the embodiments thereof, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An electric throttle comprising:
    a throttle body disposed in an intake passage of an internal combustion engine and defining a throttle passage corresponding to a part of the intake passage;
    a throttle valve adjusting an intake quantity of the internal combustion engine by increasing or decreasing an opening area of the throttle passage;
    a rotation angle sensor detecting an actual opening angle of the throttle valve;
    a motor generating a torque to drive the throttle valve such that the actual opening angle of the throttle valve detected by the rotation angle sensor matches a target throttle opening angle;
    a downstream pressure sensor detecting a pressure downstream of the throttle valve; and an abnormal-sensor determining portion determining that one of the rotation angle sensor and the downstream pressure sensor is abnormal, in a case where a condition that a tendency of the actual opening angle detected by the rotation angle sensor does not match a tendency of the pressure detected by the downstream pressure sensor has continued for a period greater than or equal to a predetermined period;

wherein conditions that the abnormal-sensor determining portion is configured to monitor for determining that one of the rotation angle sensor and the downstream pressure sensor is abnormal include:

a first condition that the actual opening angle detected by the rotation angle sensor increases and the pressure detected by the downstream pressure sensor is constant or decreases, a second condition that the actual opening angle detected by the rotation angle sensor is constant and the pressure detected by the downstream pressure sensor increases or decreases, a third condition that the actual opening angle detected by the rotation angle sensor decreases and the pressure detected by the downstream pressure sensor is constant or increases, a fourth condition that the pressure detected by the downstream pressure sensor increases and the actual opening angle detected by the rotation angle sensor is const' or decreases, a fifth condition that the pressure detected by the downstream pressure sensor is constant and the actual opening angle detected by the rotation angle sensor increases or decreases, and a sixth condition that the pressure detected by the downstream pressure sensor decreases and the actual opening angle detected by the rotation angle sensor is constant or increases;

and responsive to the abnormal-sensor determining portion determining that one of the rotation angle sensor and the downstream pressure sensor is abnormal, the abnormal-sensor determining portion is configured to terminate energization to the motor.

2. The electric throttle according to claim 1, wherein the downstream pressure sensor is mounted to the throttle body and detects the pressure downstream of the throttle valve in the throttle passage.

3. The electric throttle according to claim 1, wherein the downstream pressure sensor is an existing intake pressure sensor mounted to the intake passage downstream of the throttle body.

4. The electric throttle according to claim 2, further comprising:

a temperature sensor detecting a temperature of an intake air flowing through the throttle passage; and a computation circuit computes the intake quantity of the internal combustion engine, based on the actual opening angle detected by the rotation angle sensor, the pressure detected by the downstream pressure sensor, and the temperature detected by the temperature sensor.

5. The electric throttle according to claim 4, wherein the computation circuit computes the opening area of the throttle passage based on the actual opening angle of the throttle valve detected by the rotation angle sensor, the computation circuit computes a flow rate of the intake air flowing through the throttle passage based on at least on a differential pressure between a pressure upstream of the throttle valve and the pressure downstream of the throttle valve, and the computation circuit computes the intake quantity of the internal combustion engine based on the opening area of the throttle passage and the flow rate of the intake air;

the computation circuit uses the pressure upstream of the throttle valve as an atmospheric pressure, and the computation circuit computes a difference between the atmospheric pressure and the pressure detected by the downstream pressure sensor as the differential pressure of the throttle valve.

6. The electric throttle according to claim 4 wherein the computation circuit computes the opening area of the throttle passage based on the actual opening angle of the throttle valve detected by the rotation angle sensor, the computation circuit computes a flow rate of the intake air flowing through the throttle passage based at least on a differential pressure between a pressure upstream of the throttle valve and the pressure downstream of the throttle valve, and the computation circuit computes the intake quantity of the internal combustion engine based on the opening area of the throttle passage and the flow rate of the intake air;

the electric throttle further comprises:

an upstream pressure sensor disposed in the throttle passage and detecting a pressure upstream of the throttle valve, wherein the computation circuit computes a difference between a pressure detected by the upstream pressure sensor and the pressure detected by the downstream pressure sensor as the differential pressure of the throttle valve.

7. The electric throttle according to claim 5, wherein the computation circuit corrects the air density according to the temperature detected by the temperature sensor, when the computation circuit computes the flow rate of the intake air flowing through the throttle passage.

8. The electric throttle according to claim 4, wherein the rotation angle sensor includes a hall element outputting an electric signal according to a magnetic-flux density, and a diode compensating a temperature property of the hall element, and the diode is also used as the temperature sensor.

9. The electric throttle according to claim 1, wherein:

a case in which the tendency of the actual opening angle detected by the rotation angle sensor does match the tendency of the pressure detected by the downstream pressure sensor is indicative of a determination that both the rotation angle sensor and the downstream pressure sensor are normal.

* * * * *